Nov. 3, 1925.
M. KLÖTZER
PRODUCTION OF COMBUSTIBLE GAS
Filed July 31, 1924
1,559,622
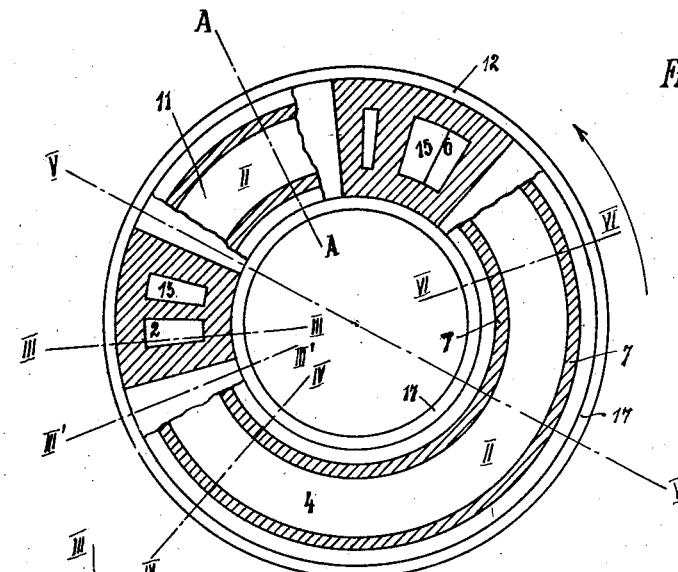
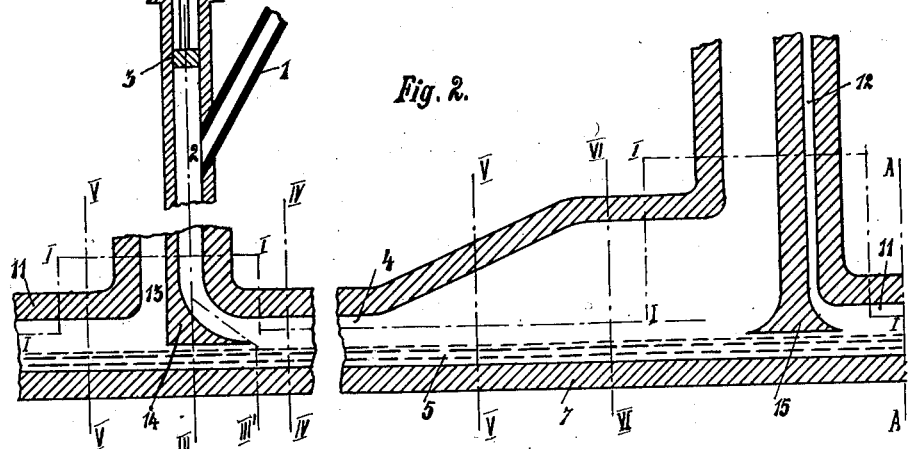
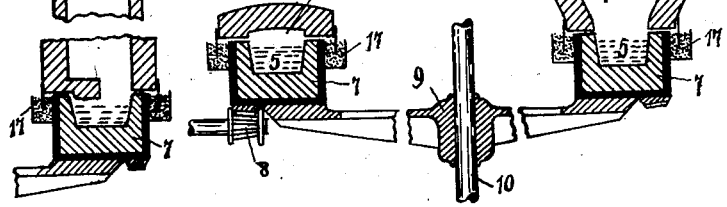

Patented Nov. 3, 1925.

1,559,622

UNITED STATES PATENT OFFICE.

MAX KLÖTZER, OF DRESDEN, GERMANY.

PRODUCTION OF COMBUSTIBLE GAS.

Application filed July 31, 1924. Serial No. 729,314.

*To all whom it may concern:*

Be it known that I, MAX KLÖTZER, a citizen of Germany, residing at Dresden, Saxony, Germany, have invented certain new and useful Improvements in Production of Combustible Gas (for which I have filed an application in Germany August 18, 1922), of which the following is a specification.

This invention relates to a method of recovering combustible gases such as water gas, producer gas, or a mixture of both, from powdered fuel.

The chief object of this invention is to utilize the carbonized residue remaining after freeing bituminous substances from gas for the purpose of recovering the by-products such as primary tar and gases. The carbonized residue consists mostly of semi-baked coke capable of being easily pulverized and rich in ashes. Except for molding into briquettes at high cost, this semi-coke disregarding direct combustion, cannot be utilized in any other way than through gasification, while in powdered form. The perfectly dry semi-coke must previously be very finely ground, for it is obvious that carbon particles in finely comminuted condition suspended in the glowing heat render the reduction of solid carbon substances into gaseous state extremely easy.

Apart from this, the new method can be applied to dry small coke or other fuel low in moisture and gas as for instance, anthracite coal. The invention consists in that the fuel mixture is blown into a closed chamber and is whirled over a slag bath maintained in a red-hot liquid state, by means of a pump alternately through suction in opposite directions to or compression in the same direction with the stream.

Advantageously the slag bath consists of a hot liquid stream flowing through the gas producing chamber, which is annularly closed and is durably maintained at the same temperature at one place outside the decomposition chamber by burning a mixture of gas and air or the like.

For the production of producer gas, a fuel mixture must be used, which, according to theoretical requirements, contains 4.32 cubic meters of atmospheric air for 1 kilogram of carbon. In practice, however, the proportion of air and carbon will not be uniform at all parts of the fuel mixture. Consequently local explosions may occur, which will disturb the movement of the mixture suspended in the high heat and the uniform production of gas. This must be avoided, if the powdered fuel does not naturally possess sufficient ashes, by the addition of incombustible powder, which becomes itself heated by absorbing the excess of heat suddenly produced by the local explosions, which heat in the course of the gasification process is recovered, thus balancing the temperature during the process.

During the gasification of the coal by means of water gas, the reaction of the water vapor ($H_2O + CO \rightleftharpoons CO_2 + H_2$) is constantly effective in a secondary action and has a certain influence on the composition of the gas. This action is greatly accelerated by the catalytic effect of the ash components of the fuel (see De Grahl "Wirtschafliche Verwertung der Brennstoffe" second edition, 1921, published by R. Oldenburg, Munich, Bavaria, Germany, p. 163, and Fischer-Gwosdz "Kraftgas" second edition, 1921, published by Otto Spamer, Leipzig, Saxony, Germany, pp. 87, 92 and 118).

With heretofore used processes of producing water gas from granular fuel, on the consumption of the carbon components, there repeatedly arise glowing ash constituents on the surface where they have the effect of immediately accelerating the water gas reaction taking place in the gasification phase.

When, according to the present method, the fuel is used in a finely ground form for the production of water gas, then on the gasification of low ash fuel as for instance, charcoal or petroleum coke there will be an insufficient quantity of ash constituents and they will not be uniformly distributed in the fuel mixture to act on the glowing carbon at every place of the mixture and at the moment of the water vapor decomposition, so as to accelerate the establishment of the water gas balance ($H_2O + CO = CO_2 + H_2$) and to cause the displacement of the latter toward the carbon dioxide thus $H_2O + CO = CO_2 + H_2$, and to secure the rapid formation of carbon dioxide and by drying in the first step of the gasification phase. When the reaction is slow for a part of the gases produced, then the corresponding part of the carbon dioxide has not enough time to be reduced to carbonate monoxide and the non-reduced part lowers the heating capacity of the gas produced. For this reason, in the gasification of low ash fuel to water gas, a corresponding excess quantity of incombustible powder must be admixed with the fuel mixture, so that even with large quantities treated and while the process lasts but a few seconds, the primarily arising gases will find at the place and at the moment they arise all the ash constituents necessary for the accelerated establishment of the water gas balance ($H_2O + CO = CO_2 + H_2$) so that the carbon dioxide formed almost instantaneously at the high temperature will have the full time necessary for the reduction to carbonic oxid and hence draw off generated water gas of high heating capacity.

The gas generator is constructed in an elongated form in which the slag bath forms the bottom and the superposed passage through which the stream of the fuel mixture flows is first low in height but later receives an increase in volume that exceeds the increased volume of the mixture caused by the gasification, so that the speed of the current is reduced and the slag particles carried along by the gas are deposited on the slag bath.

The new process not only renders it possible to economically utilize the previously mentioned carbon containing residue but also shows a way for uninterrupted generation of pure water gas, which heretofore in practice could be produced only through alternate blow and run.

The new process also enables the recovery of gases substantially free from carbon dioxide. Furthermore the whirling suspension of the fuel mixture for a comparatively long time in the high temperature of the decomposition chamber insures complete decomposition of the carbon dioxide into carbonic oxid in presence of red-hot carbon, while with known gas generators a part of the carbonic acid unavoidably remains undecomposed. My new process also permits the production of entirely dry producer gas, since the heretofore unavoidable water vapor used for the cooling of the grates and mellowing or softening of the slag does not come into consideration. The slag bath according to the new process is in constant circulation, so that any excess resulting from adding slag from time to time can be removed.

A further advantage over the heretofore known processes consists in the utilization of the radiating heat of the red-hot slag bath for rendering red-hot the carbon particles of the fuel mixture, until they are completely consumed. The slag bath continuously restored to its required temperature flows in a continuous stream into the gas generating chamber.

The fuel mixture does not flow, as in known gas generators, on a restricted surface, consisting of a layer of coarse granular red-hot fuel, that is consumed and in the measure of consumption must be replaced by recharging the gas generator. With the new process, a corresponding consumption of valuable fuel is eliminated. The fuel mixture does not flow off on a surface maintained externally red-hot, which, according to its heat conductivity, more or less resists the passage of heat. Moreover the new process prevents the loss of heat resulting therefrom.

The admixture of incombustible powder to the fuel mixture to prevent the spreading of local explosions, when part of the carbon particles is burnt, enables the gasification of these powdered fuel substances into producer gas, from which at the previous distillation either not all easily exploding carbon-hydrogen compounds have been extracted or which by nature do not contain a too high percentage of such gases.

In the accompanying drawing, one embodiment of my gas generator is shown, for carrying out my new method, Fig. 1 being a section of the generator on line I—I of Fig. 2; Fig. 2 a cross section in a vertical plane of the generator, said section starting from the central circular line of the slag bath and terminating on line A—A in Fig. 1; Fig. 3 a vertical section through the mixing chamber and the passage thereof into the gas generating chamber on line III—III of Figs. 1 and 2; Fig. 4 a cross section through the gas generating chamber on line IV—IV in Figs. 1 and 2; Fig. 5 a vertical cross section through the combustion chamber (left) and through the broadening part of the gas generating chamber (right) of the apparatus on line V—V of Figs. 1 and 2 and Fig. 6 a vertical cross section through the widest part of the gas generating chamber on line VI—VI of Fig. 1.

The mixture of powdered fuel and an oxygen carrier, in this case highly superheated water vapor, to be gasified, is blown into the mixing chamber through the inlet pipe 1, and is thoroughly whirled through by the alternate suction and compression action of the piston 3 and then enters the circular gas generating chamber 4 in which it remains suspended in a whirling motion over the red-hot liquid slag bath 5 which radiates the necessary heat for rendering the carbon particles red-hot. In the broadening part of the gas generating chamber 4, the gasification is completed, the action of the piston 3 ceases, the gas assumes a reduced velocity and the slag particles carried along with the gas are able to settle on the slag bath. The generated gas is then drawn off through the duct 6.

The slag bath is located in the annular trough 7, which is rotated in the direction of the arrow (Fig. 1) by means of the driving means 8. The trough 7 is carried by a toothed wheel 9 fixed horizontally on a vertical suitably journalled spindle 10.

The slag bath cooled by the gas generating process is caused by rotation to continuously pass under the heating chamber 11 in which a mixture of gas and air admitted through inlet pipe 12 is burnt and the heat withdrawn from the gas generating chamber at a correspondingly increasing temperature is passed to the slag bath. The combustion gases are carried off from the combustion chamber 11 by the flue 13. Between the combustion chamber and the gas generating chamber extend the partitions 14, 15, into the space above the slag bath terminating close to the surface of the latter and separating the combustion chamber from the gas generating chamber.

The excess slag falling into the slag bath is removed from time to time through the passage 16, during short interruptions of the rotation of the trough. The closure of the gas generator externally is effected by the sand seal 17.

What I claim is:—

1. Process of producing combustible gas from carbon and an oxygen carrier, consisting in glowing a mixture of powdered fuel and steam into a gas generating chamber over a molten heat radiating slag bath, stirring by pulsation said fuel mixture over said slag bath, and gasifying said fuel mixture by the radiated heat from said slag bath.

2. Process of producing combustible gas from carbon and an oxygen carrier, consisting in blowing a mixture of powdered fuel and steam into a gas generating chamber, heating a high glowing liquid stream in a separate heating chamber and conveying the same into said gas generating chamber to form a molten heat radiating slag bath, stirring by pulsation said fuel mixture over said slag bath, and gasifying said fuel mixture by the radiated heat from said slag bath.

3. A gas generator for producing combustible gas from a mixture of carbon particles and an oxygen carrier, comprising a gas producing chamber, an adjacent annular revoluble molten slag heating chamber connected to said gas generating chamber, and a hermetically sealed stationary cover therefor.

4. In a gas generator for producing combustible gas from a mixture of carbon particles and oxygen carrier, a gas generating chamber, an adjoining heating chamber formed with said gas generating chamber, a revoluble and annular trough having a stationary cover, the bottom of which is hermetically sealed against said stationary cover, and which contains a molten slag bath strongly heated in said heating chamber and radiating the heat for gasifying the fuel by turning said trough, said gas generating chamber being provided with an inlet for the fuel mixture and an outlet for generated gas, a mixing chamber between said inlet and gas forming chamber, a pump for whirling and stirring the fuel mixture in the gasification chamber and over said slag bath in the gas generating chamber, the latter being first low in height but subsequently receiving an increase in volume that exceeds the increased volume of the gasified mixture.

In testimony whereof I affix my signature.

MAX KLÖTZER.